Oct. 14, 1958 — B. COOPER ET AL — 2,856,176
PRINT CONTROLLING DEVICE FOR WEIGHING SCALES
Filed Aug. 19, 1953 — 2 Sheets-Sheet 1
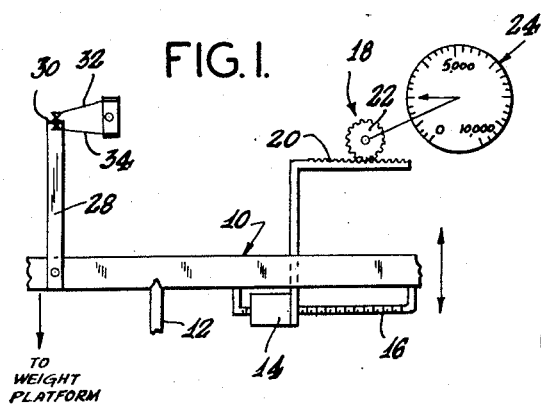
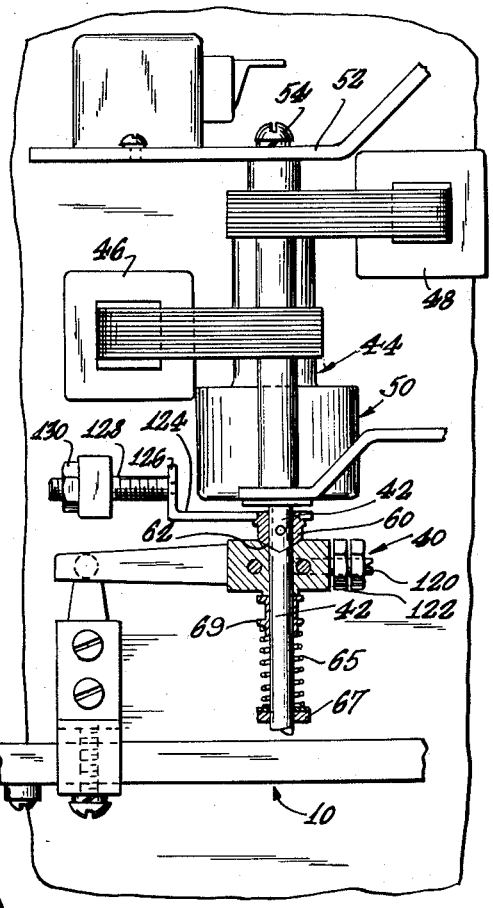
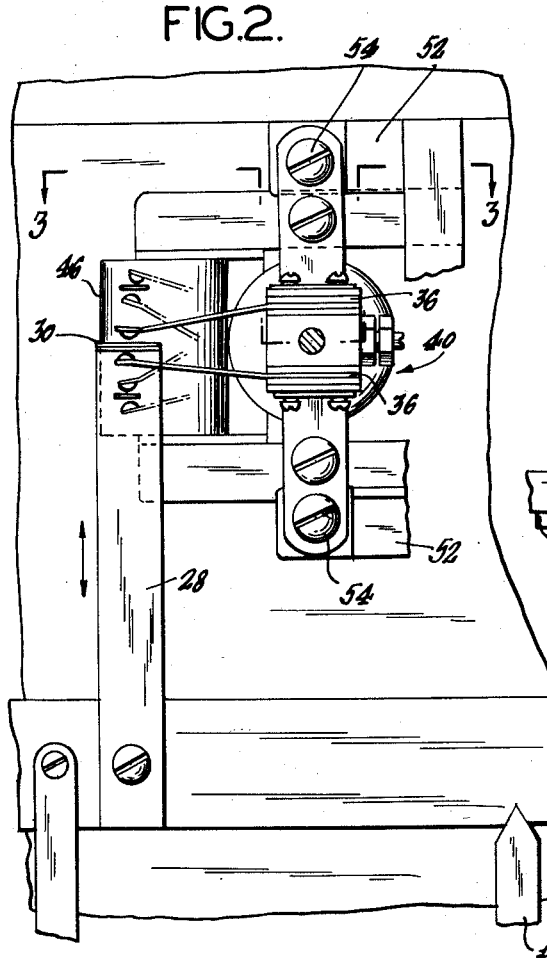
INVENTORS.
BENJAMIN COOPER
ALBERT HOHMANN
BY
ATTORNEY.

Oct. 14, 1958        B. COOPER ET AL        2,856,176
PRINT CONTROLLING DEVICE FOR WEIGHING SCALES
Filed Aug. 19, 1953                              2 Sheets-Sheet 2

INVENTORS.
BENJAMIN COOPER
ALBERT HOHMANN
BY
*J.B. Felshin*
ATTORNEY.

2,856,176
Patented Oct. 14, 1958

United States Patent Office

2,856,176
PRINT CONTROLLING DEVICE FOR WEIGHING SCALES

Benjamin Cooper, Brooklyn, N. Y., and Albert Hohmann, Teaneck, N. J.; said Hohmann assignor to said Cooper Application August 19, 1953, Serial No. 375,154

5 Claims. (Cl. 265—5)

This invention relates generally to printing weight scales and, in particular, to a device for controlling the printing operations in a printing weight scale whereby printing cannot occur until the scale has come to rest.

It is conventional practice to provide a time delay mechanism inherently provided with a fixed period of operation in printing type scales, i. e., scales where the recorded weight is printed on a record. The art of printing the result of a weighing operation is well known and may be preformed by electromagnetic counters which set up digit or number wheels in accordance with the weight of the articles placed on the scales. Obviously, it is not desirable that this printing operation occur while the scale is unbalanced, for in such an event, an erroneous reading will be recorded. To prevent the recording of an erroneous reading the fixed time delay principle has been utilized. This fixed time delay is usually much longer than necessary to insure the fact that the scale will be balanced before a print operation may occur. If the fixed period is shortened, then the possibility of permitting a printing operation to occur before the scale balances is introduced.

The present invention provides a print delaying means that is controlled by the scale beam. The time delay is variable to provide the minimum period necessary to accomplish the intended printing delaying operation.

One of the principal objects of the invention resides in the provision of a control means for electrically delaying the printing operation by means directly responsive to and controlled by the unbalanced condition of the scale.

Another object of the invention resides in the provision of means controlled by the scale beam to actuate said time delay means.

Still another object of the invention resides in the provision of shock absorber means for coupling the time delay means to the scale whereby the initial shock movement of the scale beam will not harm the time delay means while still initiating an operation of the time delay means.

Still another object of the invention is to provide a novel follower control means for controlling the time delay means to assure actuation of the time delay means until the beam of the scale is balanced.

Yet another object of the invention resides in the provision of adjustable fixed time delay means that is operable to provide a fixed minimum time delay after the scale beam is balanced.

Other ancillary objects will be, in part, hereinafter apparent and will be, in part, hereinafter pointed out.

In the drawings:

Figure 1 is a schematic diagram illustrating in part a scale beam and the time delay controlling means.

Figure 2 is a front elevation of the time delay actuating mechanism.

Figure 3 is a plan view of the time delay mechanism, with a portion thereof shown in cross section, taken along line 3—3 of Figure 2 and more fully illustrates the novel clutch mechanism.

Figure 4:
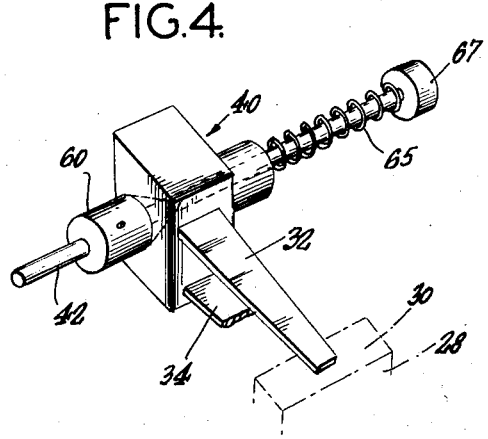
Figure 4 is isometric projection of the time delay clutch mechanism illustrating the mechanism in normal, at rest relation.

Referring to the drawings in detail, 10 generally designates the balance beam of a weight scale which is balanced on the pivots 12. Balance beam 10 is conventionally in operation and is connected by means, not shown, to a weight platform that is adapted to receive thereon the article which is being weighed. As shown in Figure 1, the arrow represents this means. The mechanism connecting the balance beam to the weight platform is conventional and forms no part of the present invention. The opposite portion of the balance beam 10 has mounted thereon a poise 14 that is adapted to travel along poise support 16 affixed to the beam 10. In principle, poise 14 is moved by means, not shown, to a point wherein the beam 10 is balanced relative to the load applied on the weighing platform.

A simple dial indicating mechanism generally designated as 18 is controlled by the poise 14 and comprises a rack 20 that is engageable with a pinion 22. Pinion 22 directly rotates a pointer to indicate on a dial 24 the weight of the load on the platform. This is an extremely simple illustrative mechanism and it will be understood that in conventional practice a much more complex mechanism is employed. This indicating mechanism forms no part of the present invention and is merely provided to illustrate the principle of operation of the balance beam. It is sufficient to state that the poise 14 will travel longitudinally along the beam until a balanced condition exists. Means, not shown, controls the movement of the poise and it is a generally accepted function of the poise to alternately over-balance and under-balance and gradually diminish in movement until the exact balance is reached. This over-balancing and under-balancing operation prevents the accurate settling of the balance beam until a minimum period of time has elapsed. It is obvious to those skilled in the art that a weight reading taken during the over-balancing and under-balancing operation will be erroneous and until the settled condition results the accurate weight cannot be determined. This feature is extremely important in those scales that produce a printed record of the accurate weight. It is evident that should the printing operation occur during the unbalanced condition, an erroneous weight will be recorded. To prevent the printing operation from occurring during the unbalanced condition, time delay devices have heretofore been utilized that employ means to delay the printing operation for a predetermined period of time. To insure accuracy of weight recording this predetermined period of time is obviously longer than the maximum time consumed by the unbalanced condition. The present invention provides a novel system for preventing the printing operation from occurring until the beam is balanced and does not utilize the predetermined time delay mechanism heretofore employed.

The present invention comprises a vertical member 28 that extends upwardly from the half of the beam that is connected to the weight platform. Member 28 is provided with an angular extension 30 having electrically conducting upper and lower surfaces for reasons hereinafter appearing. Angular extension 30 is adapted to co-act with a pair of spaced contact members 32 and 34 respectively.

Contact members 32 and 34 are mounted by insulated strips 36 to a rotatable mechanism generally designated as 40. Mechanism 40 is rotatably mounted on shaft 42 of a synchronous motor generally designated as 44 having a pair of energizing coils 46 and 48 respectively. Further, shaft 42 of synchronous motor 44 is connected to said motor by means of a gear reduction unit 50. Motor 44 is conventional and is of the type wherein the shaft 42 has a revolution per minute speed of approximately one revolution per minute. It will be understood that shaft 42 will rotate in one direction upon the energization of coil 46 and will rotate in the opposite direction upon the energizing of the coil 48. To accomplish this rotation control, it is obvious that only one of the coils is energized at any given period. Means hereinafter appearing are provided to control the energizing of the respective coils 46 and 48. Synchronous motor 44 is mounted to a frame member 52 by means of screws 54 in a fixed manner, i. e., wherein the motor unit 44 does not move relative to the moving balance beam 10.

Motor shaft 42 of synchronous motor 44 is provided with a collar 60 that is secured thereto and rotatable therewith. Collar 60 is tapered on its outermost side for a purpose hereinafter appearing.

Rotatable mechanism 40 is provided with a complimentally tapered recess 62 in which the tapered portion of collar 60 is adapted to reside. Mechanism 40 is urged into engagement with the collar 60 by means of coil spring 65 that is circumjacently disposed on the shaft 42 and abuts against a fixed collar 67 at one end and against a bearing spacer 69 at its opposite end. As shown in Figure 4, collar 60 normally resides in the recess 62 of mechanism 40 in nested coaligning relation.

Figure 5:
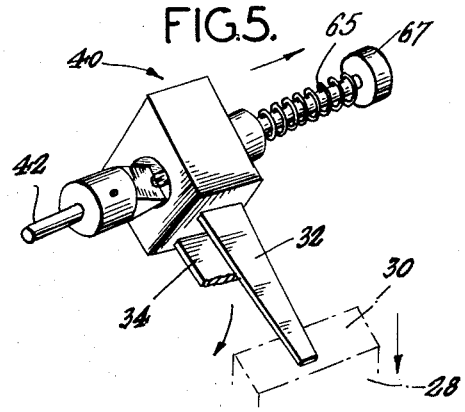
Figure 5 is an isometric projection of the novel clutch mechanism in actuated condition wherein the controlling time delay motor has not yet had sufficient time to catch up with the initial distortion of the clutch mechanism by the initial movement of scale beam.

When a load is placed on the weight platform and the balance beam is initially displaced whether this displacement be upwardly or downwardly is of no consequence. It is sufficient to state that the application of a load to a scale will result in abrupt movement of the balance beam. Analogously, the lever 28 is likewise abruptly displaced. The contact forming extension 30 thereon engages the respective contact 32 or 34 and rotates mechanism 40 in the appropriate direction. When this condition occurs, the collar 60 remains stationary and cams the rotatable mechanism 40 outwardly along the shaft 42 against the tension of spring 65. It will be evident that the degree of displacement of the contacts 32 and 34 will be less than ninety degrees so that the rotatable mechanism 40 cannot lock against the collar 60. The longitudinal displacement of the mechanism 40 is particularly well illustrated in Figure 5 of the drawings. The separation of the collar 60 and the mechanism 40 is in effect a shock absorbing function. The engagement of the contact portion 30 with a respective contact 32 or 34 energizes the respective coils 46 or 48 of the synchronous motor 44. Thus, motor 44, upon being energized, rotates shaft 42 in the appropriate direction to restore collar 60 and rotary mechanism 40 to their previous coaligning relationship. When this coaligning relationship occurs the contacts 32 or 34 will be out of engagement with the contact portion 30 of lever 28 by virtue of the beam achieving a balanced condition.

It will be understood that under-balancing will in effect close one contact such as 32, while over-balancing will result in engagement of the lever 28 with the contact 34. The over-balancing and under-balancing condition alternately occurs until a balanced condition exists. The alternate engagement of the respective contacts results in the alternate energization of the respective coils 46 and 48 and, accordingly, the collar 60 follows the direction of rotation of the mechanism 40.

Figure 6:
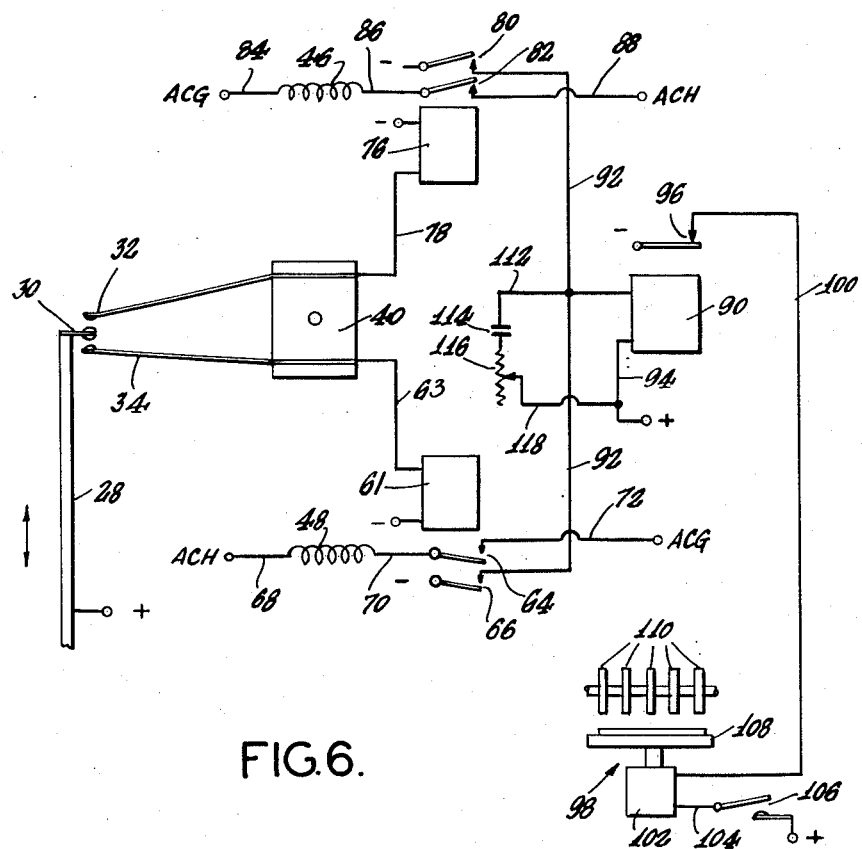
Figure 6 is a schematic diagram of the time delay means and the circuit controlled thereby.

A control circuit is provided that controls the operation of the respective coils 46 and 48 and further controls the printing operation. As shown in Figure 6, lever 28 is connected to a positive source of potential. Thus, a positive potential exists on the contacting surfaces of extension 30 at all times. Accordingly, the displacement of lever 28 downwardly such as would occur with an under-balancing results in the engagement of extension 30 with contact 34. Such a condition energizes relay 61. This circuit may be traced as follows: From positive potential to lever 28, extension 30, contact 34, conductor 63 to one terminal of the coil of relay 61, the other terminal of the coil of relay 61 is connected to a source of negative potential. The energizing of relay 61 effects the closing of normally open contacts 64 and 66 respectively. Contacts 64, when closed, energize the coil 48 of synchronous motor 44. This circuit may be traced as follows: From ACH (alternating current hot) over conductor 68 from one terminal of the coil 48, the other terminal of said coil is connected by conductor 70 to the swinging contact of the contacts 64. The fixed contact of said contacts is connected by conductor 72 to ACG (alternating current ground). Thus, the motor 44 becomes energized and rotary mechanism 40 is eventually normalized by means of the collar 60 on shaft 42. When this condition occurs, contact 34 is moved out of engagement with extension 30 and the circuit to relay 61 is interrupted. Accordingly, contact 64 opens and coil 48 de-energizes. In a similar manner, should the poise travel too far along the beam 10, extension 30 will engage contact 32 to energize relay 76 over a circuit that may be traced from a positive source of potential through lever 28, extension 30, contact 32, over conductor 78 to one terminal of the coil of relay 76. The other terminal of the coil of relay 76 is connected to a source of negative potential. The energizing of relay 76 effects the closing of normally open contacts 80 and 82 respectively. The closing of contacts 82 energizes coil 46 and results in the counter rotation of shaft 42, collar 60 and rotatable mechanism 40. This circuit may be traced as follows: From ACG over conductor 84 to one terminal of coil 46, from the other terminal of coil 46 over conductor 86 through closed contacts 82 and over conductor 88 to an ACH. When the poise 14 stops and reverses itself to seek its balanced condition, extension 30 is disengaged from contact 32 and relay 76 de-energizes. Accordingly, contacts 82 open and coil 46 de-energizes.

Thus, it will be evident that an electric follower circuit is provided whereby the respective under-balancing or over-balancing of the beam 10 causes motor 44 to respond accordingly. When the final balance condition is achieved by the beam 10, extension 30 is disengaged from both contact 32 and contact 34. Only when this condition has occurred is it permissible that a printing operation be performed. Means are provided to prevent a printing from occurring until this balanced condition is achieved and directed toward this end is the provision of contacts 66 associated with relay 61 for an under-balance and the contacts 80 associated with relay 76 for an over-balance. Contacts 66 and 80 are disposed in a parallel arrangement to control the energization of relay 90. The parallel circuit may be traced as follows: From a negative source of potential through contacts 66 over conductor 92 to one terminal of the coil of relay 90. The circuit may be traced from a negative source of potential through contacts 80 and over conductor 92 to the specified terminal of the coil of relay 90. The other terminal of the coil of relay 90 is connected by conductor 92 to a source of positive potential. Thus, the closing of either contacts 66 or contacts 80 results in the energization of relay 90. Relay 90 has associated therewith normally closed contacts 96 that are included in a circuit that controls a printing mechanism. This circuit may be traced as follows: From a negative source of potential through the normally closed contacts 96 over conductor 100 to one terminal of the printing solenoid 102. The other terminal of the coil of printing solenoid 102 is connected by a conductor 104 to a normally open switch 106 which is in turn connected to a source of positive potential. Thus, the closing of the switch 106 by extraneous means, not shown, energizes solenoid 102 to effect a printing operation when the contacts 96 are in their normal position. This is possible only when relay 90 is de-energized. Printing mechanism 98 comprises the usual solenoid 102 having a platen 108 that is spaced from but adapted to engage printing wheels 110 of the weight recording mechanism. Printing wheels 110 are well known to those skilled in weight recording art and are settable in accordance with the weight of the article on the weighing platform. These printing wheels conventionally respond continuously to changing load conditions. Therefore, it is extremely desirable that a printing operation does not occur while the load conditions are changing. When energized, the solenoid 102 urges platen 108 and a recording medium, not shown, into engagement with the print wheels 110.

From the foregoing, it will be evident that at any time during which an under-balance or an over-balance condition exists relay 90 will be energized and contacts 96 will be open. Therefore, solenoid 102 cannot be energized. To prevent the energizing of solenoid 102 during the momentary transfer of extension 30 from engagement with contact 32 to engagement with contact 34 or vice versa, a capacitance resistance network is provided to delay the de-energizing of relay 90 for a predetermined period of time. This is accomplished by the circuit that exists from conductor 92 over conductor 112 to one terminal of the capacitor 114. The other terminal of capacitor 114 is connected to variable resistance 116. The variable arm of resistance 116 is connected by conductor 118 to the conductor 94. Thus, the capacitance resistance network is disposed across the terminals of the coil of relay 90. Therefore, the electrical charge on the capacitor 114 is sufficient to prevent the immediate de-energization of relay 90 and until the charge is dissipated through resistance 116, relay 90 remains energized. The time interval during which the charge is dissipated is variable by means of the variable resistance 116. Accordingly, relay 90 will not de-energize immediately upon the opening of the respective contacts 66 or 80. The time delay provided by the resistance capacitance network is not to be confused with the time delay mechanism heretofore utilized for delaying printing operations for it is obvious with the present time delay caused by this network is only momentary while the time consumed by the prior device was far in excess of that necessary to accomplish the intended purpose.

It will thus be seen that there is provided a device in which the several objects of the invention are achieved and which is well adapted to meet the conditions of practical use.

As various embodiments may be made of the above invention and as various changes may be made in the embodiment set forth, it is to be understood that all matters herein set forth or shown in the drawings are to be interpreted as illustrative and not in a limiting sense.

The invention claimed is:

1. In a weighing scale having means to indicate and print the weight of an article being weighed, in combination, a balance beam adapted to be unbalanced upon the application of a load on the scale, including means to return the beam to balanced condition, printing means to print the weight of the article being weighed, means to actuate said printing means, and means controlled by said balance beam to prevent actuation of said printing means while the balance beam is unbalanced, said last means comprising a contact carried by said beam, a pair of normally spaced contacts mounted on a shaft and rotatable therewith, said spaced contacts being disposed out of engagement with said first contact and adapted to be alternately engaged upon the overbalance and underbalance of the beam, a reversible motor energizable upon the engagement of said first contact with either one of said second contacts, the shaft of said motor being selectively directional in accordance with the second contact that is engaged, to rotate said second contacts in the same direction, clutch means interconnecting said motor shaft and the shaft mounting said second contacts, and means for indexing said clutch means relative to said motor wherein said second contacts are disposed equidistant from said first contact to de-energize said motor.

2. In a weighing scale having means to indicate and print the weight of an article being weighed, in combination, a balance beam adapted to be unbalanced upon the application of a load on a scale, including means to return the beam to balanced condition, printing means to print the weight of the article being weighed, means to actuate said printing means, means controlled by said balance beam to prevent the actuation of said printing means while the balance beam is unbalanced, said preventing means including normally-open switch means journaled on a shaft and rotatable therewith, said shaft being directionally rotatable upon the unbalancing of the beam to close said contacts, and clutch means resiliently coupling said shaft with said switch means to decrease the retrograde pressure of the switch means upon the closure of said switch means upon the balance beam being overbalanced or underbalanced.

3. In a weighing scale having means to print the weight of an article being weighed, in combination, printing means, means to actuate said printing means to print the weight of the article, said scale including a balance beam adapted to alternately overbalance and underbalance upon the initial application of the article on the scale, and means to prevent actuation of said printing means while said balance beam is in an unbalanced condition, said print preventing means comprising normally open switch means, adapted to be moved to closed relationship by the underbalancing and overbalancing of the beam, a motor energized by the closing of said normally open switch means, a rotary member adapted to restore said normally open switch means to their normally open positions, clutch means interconnecting said motor and said rotary member, means actuatable by said normally open switch means to prevent actuation of said printing means while said switches are in closed relationship, and means to de-actuate said print preventing means a predetermined time after said balance beam is balanced.

4. In a weighing scale having means to print the weight of an article being weighed, in combination, printing means, means to actuate said printing means to print the weight of the article, said scale including a balance beam adapted to alternately overbalance and underbalance upon the initial application of the article on the scale, means to prevent actuation of said printing means while said balance beam is in an unbalanced condition, said print preventing means comprising normally open switch means adapted to be moved to closed relationship between underbalancing and overbalancing of the beam, a motor energized by the closing of said normally open switch means, a rotary member adapted to restore said normally open switch means to their normally open positions, clutch means interconnecting said motor and said rotary member including means to index the switch means in their normally open positions, means actuatable by the normally open switch means to prevent actuation of said printing means while said switches are in their closed relationship, means to de-actuate said print preventing means a predetermined time after the said balance beam is balanced, and adjustable means for varying the predetermined time wherein said print preventing means is actuated while the beam is changing from an overbalanced condition to an underbalanced condition.

5. In a weighing scale having means to print the weight of an article being weighed, in combination, a balance beam adapted to be unbalanced upon the initial application of the article being weighed on the scale, means to return the balance beam to balanced condition, printing means, print preventing means, means responsive to the unbalancing of said beam to actuate said print preventing means, follower means controlled by said print preventing means, means controlled by the follower means to de-actuate said print preventing means after the balance beam is balanced, and said follower controlled means comprising a rotary member, means to rotate the rotary member in accordance with the direction of movement of said follower means and a clutch means driving said rotary member by said rotating means, said clutch means comprising a pair of separable members spring urged and complemental engagement with each other and adapted to return to said complemental engagement after one of said members has been rotated differentially relative to the other.

References Cited in the file of this patent

UNITED STATES PATENTS

| | | |
|---|---|---|
| 1,149,378 | McGarvey | Aug. 10, 1915 |
| 1,629,221 | MacNutt | May 17, 1927 |
| 2,040,073 | Brendel | May 12, 1936 |
| 2,193,707 | Baumann | Mar. 12, 1940 |
| 2,604,314 | VanBerkel | July 22, 1952 |
| 2,639,136 | VanDuyn | May 19, 1953 |

FOREIGN PATENTS

| | | |
|---|---|---|
| 508,051 | Great Britain | June 26, 1939 |